July 17, 1962

W. F. BILLINGER 3,044,216

METHOD AND APPARATUS FOR CUTTING GLASS SHEETS

Filed Feb. 10, 1958

INVENTOR.
WILLIAM F. BILLINGER.
BY
Christy, Parmelee & Strickland
ATTORNEYS.

July 17, 1962 W. F. BILLINGER 3,044,216
METHOD AND APPARATUS FOR CUTTING GLASS SHEETS
Filed Feb. 10, 1958 4 Sheets-Sheet 3

July 17, 1962 W. F. BILLINGER 3,044,216
METHOD AND APPARATUS FOR CUTTING GLASS SHEETS
Filed Feb. 10, 1958 4 Sheets-Sheet 4
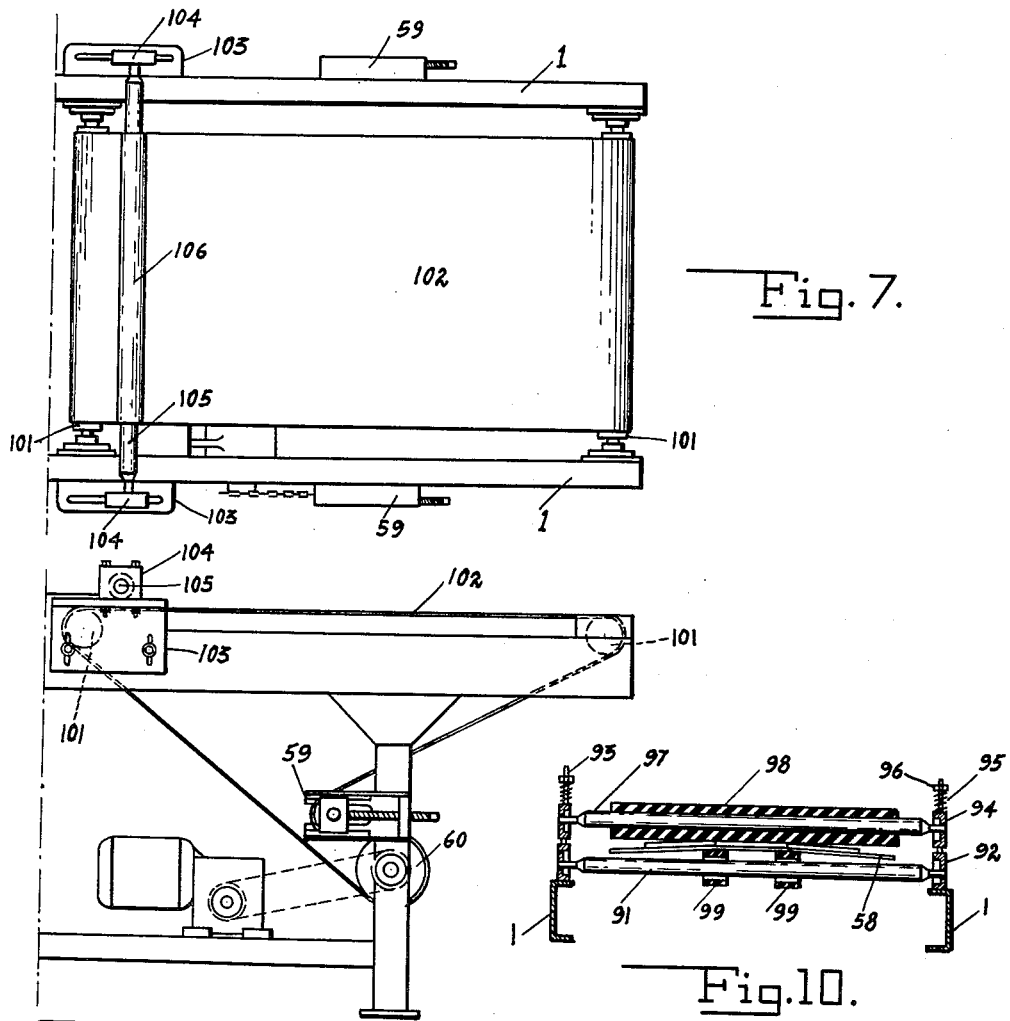
INVENTOR.
WILLIAM F. BILLINGER.
BY
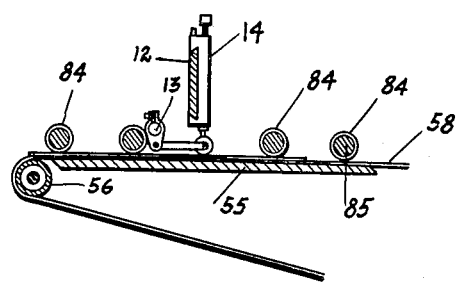
ATTORNEYS.

United States Patent Office 3,044,216
Patented July 17, 1962

3,044,216
METHOD AND APPARATUS FOR CUTTING GLASS SHEETS
William F. Billinger, Beaver St., Zelienople, Pa.
Filed Feb. 10, 1958, Ser. No. 714,211
7 Claims. (Cl. 49—48)

This invention pertains to method and apparatus for cutting glass sheets by sequentially scoring and running cuts both longitudinally and transversely of a glass sheet passing through the apparatus.

One object of the invention is to provide an apparatus wherein a glass sheet may be automatically cut, both transversely and longitudinally and the cuts run while passing over the apparatus.

Another object of the invention is to provide a novel form of breaker rolls for running cuts in glass sheets passing through the rolls.

A further object of the invention is to provide a novel form of renewable glass cutting tool for use in scoring multiple cuts in glass sheets moving therebeneath providing uniform depth of cuts and preventing chipping of the leading dge of the sheet engaging the cutting tool.

These and other objects of the invention will be made apparent from the following description and the drawings forming a part thereof, wherein:

FIG. 7 shows an enlarged plan view of a portion of the apparatus for running cross cuts in the glass;

FIG. 8 shows a side elevation of the apparatus of FIG. 7;

FIG. 9 shows a section taken on lines IX—IX of FIG. 3;

FIG. 10 shows a section taken on lines X—X of FIG. 5 showing the glass sheet passing through the breaker rolls;

FIG. 11 shows a section taken on lines XI—XI of FIG. 1 shown in the cross cut running roll.

Figure 1:
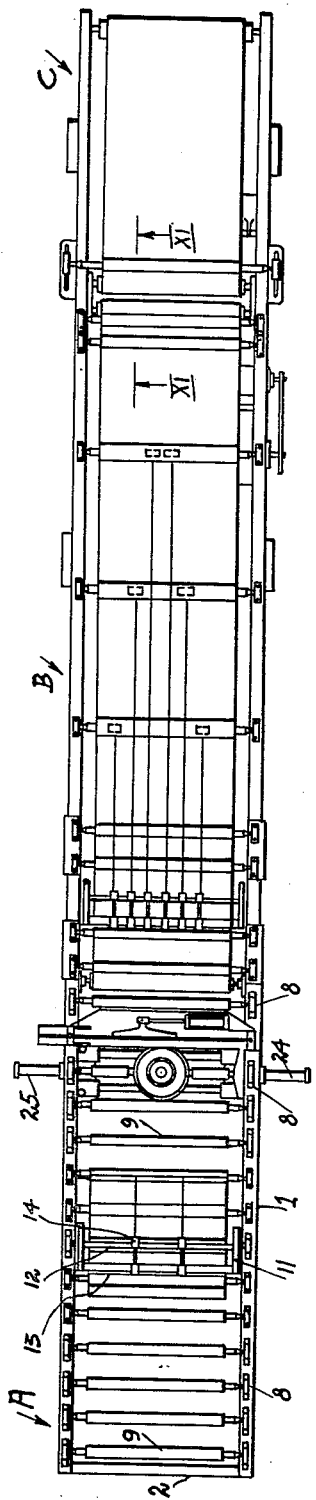
FIG. 1 shows a plan view of the entire apparatus.
Figure 2:
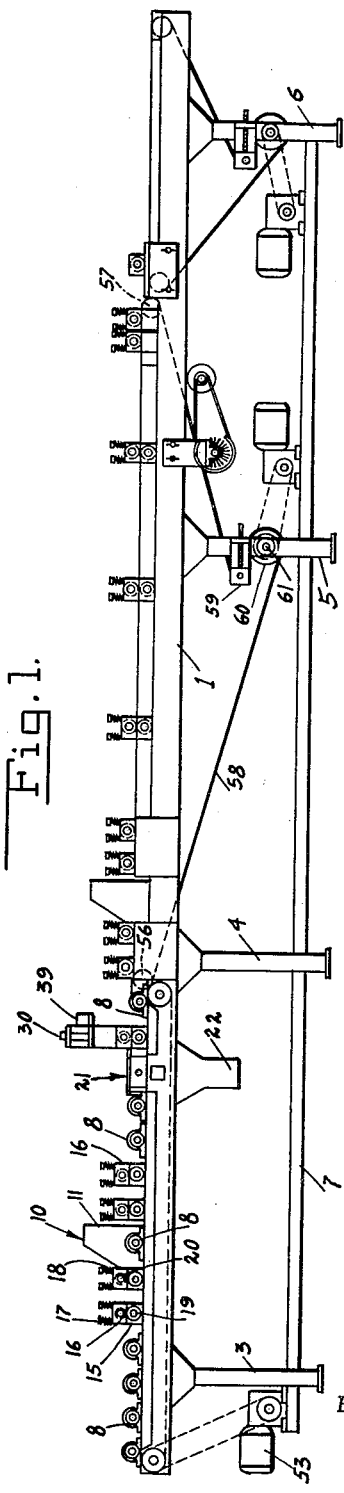
FIG. 2 shows a side elevation of the apparatus of FIG. 1.

Referring now in detail to the drawings, the assembled apparatus is shown in FIGS. 1 and 2. It is to be understood that this apparatus is comprised of three sections which may be used together in several combinations. That is, section A comprises a cross cut apparatus, section B comprises a longitudinal cutting and cut running section and section C is a cross cut running and collecting section. The three sections may be assembled together for use, section B may be separately constructed for use, and section C may be modified without affecting operation of sections A and B.

Preferably section A is provided with rubber covered rollers for conveying glass sheets through the section, and sections B and C are provided with endless flexible or rubber belts for carrying the sheets through the sections. The cut running rolls of section B require some form of flexible support for the glass passing therethrough and a rubber belt serves this purpose very well. The flexible support for the glass sheet passing through the breaker rolls of the invention permits running of parallel cuts in the sheet without regard to other parallel cuts or transverse cuts in the sheet and function regardless of whether such other cuts have or have not been run.

Referring now in detail to the drawings the base of the apparatus may be of any suitable form and for convenience is shown as having longitudinally extending side members 1 connected by transverse members 2 to form a rigid support for the mechanism hereinafter described. Suitable upright frame members 3, 4, 5 and 6 extend transversely of the base and support the longitudinal members 2 at a convenient working height. Such frame member may be connected by the member 7 which provides a convenient support for drive means hereinafter discussed. The assembly of such members 1 to 7 provides a convenient rigid support for the mechanisms hereinafter described.

Referring now to the left side of FIG. 1, the members 1 having a plurality of bearings 8 mounted thereon in longitudinal spaced relation with the bearings 8 transversely forming pairs of bearings in which are journaled the shafts of rubber covered rollers 9. These rollers 9 are spaced on opposite sides of a glass cut scoring mechanism 10. This mechanism comprises brackets 11 mounted in opposing relation on the opposite members 1, a cutter bar 12 supported by and extending between brackets 11, a cutter guide bar 13 similarly supported by the brackets 11, and glass cutters 14 adjustably mounted on the cutter and guide bars. At opposite sides of mechanism 10 are drive and hold down rolls. Such drive rolls being mounted in bearings 15 secured to the members 1 and the hold down rolls being mounted in bearings 16 adjustably mounted upon bearing 15 by means of guide rods 17 and compression springs 18. Journaled in bearings 15 are the shafts 19 having rubber covered drive rolls thereon and journaled in bearing 16 are the shafts 20 having rubber covered hold down rollers thereon.

Figure 3:
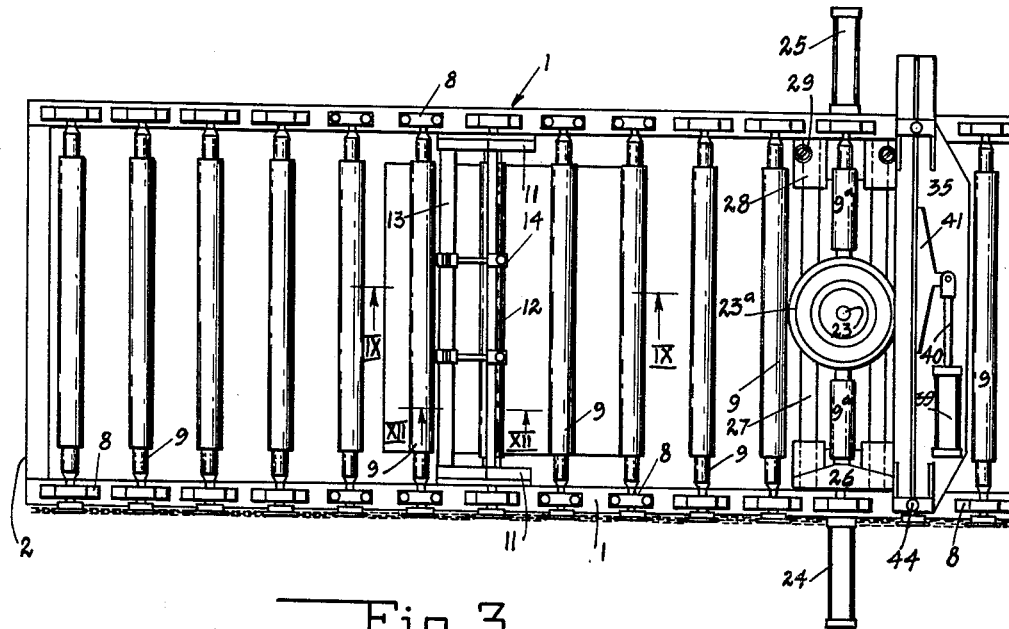
FIG. 3 is an enlarged plan view of a portion of the apparatus including means for rotating a glass sheet 90°.
Figure 4:
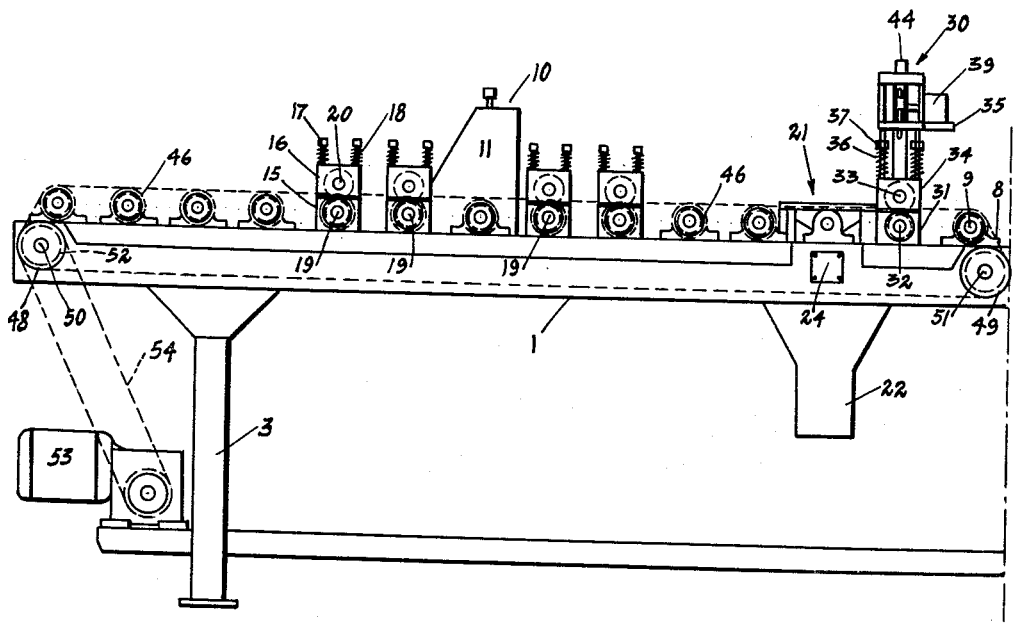
FIG. 4 shows a side elevation of the apparatus of FIG. 3.

To the right of the mechanism 10 of FIG. 1 and as best shown in FIG. 3, is a glass rotating mechanism 21. This mechanism includes an air motor 22 supported from members 1 and having a vertically disposed piston 23 extending upwardly between and intermediate the members 1. To motor 22 are suitable air lines, not shown, supplying compressed air for operation of the motor. Such motor 22 is well known in the art and several forms thereof are commercially available. The motor 22 provides for vertical reciprocation of its piston 23 and rotation thereof through an arc of 90° when in uppermost position. Mounted on piston 23 is a vacuum platen 23a of well known design for engaging a glass sheet moving thereon and raising and rotating same as hereinafter discussed. Mounted on the members 1 at opposite sides of the platen are suitable air cylinders 24 and 25. The cylinder 24 advancing and retracting a yoke 26 slidably mounted on guide rods 27 extending between the members 1. The cylinder 25 similarly advancing and retracting the heads 28 mounted on rods 27. Such heads 28 preferably having rollers 29 mounted thereon as stops for engaging the glass sheet moving therepast. The air cylinders 24 serving to position a glass sheet for advancement into the following cut scoring heads as the sheet moves through the apparatus.

Adjacent the platen 23a of piston 23 is a retractable hold down roll mechanism 30. Such mechanism includes bearings 31 mounted on opposite members 1 and within which are journaled a shaft 32 having a rubber drive roll 9 thereon. Above shaft 32 is a shaft 33 having a rubber hold down roll thereon and journaled in bearings 34. The bearings 34 are vertically moveable on support rods 35 extending upwardly from bearings 31. Adjustable compression springs 36 and nuts 37 on rods 35 hold the bearings 34 in operative position. Also mounted on rods 35 is a plate 38 extending transversely above members 1 and upon which is mounted a suitable air cylinder 39 having a reciprocating piston 40 for actuating a cam plate 41 connected to piston 40. Suitably spaced parallel inclined faces 42 on cam plate 41 are engaged by rollers 43 from which are suspended hangers 44. Hangers 44 each have a bottom eye portion through which end portions of hold down roll shaft 33 extend. The hangers 44 are disposed between suitable guides 45 which maintain them in transverse spaced relation but permit vertical movement as the rollers 43 are raised and lowered by reciprocation of cam plate 41 concurrent with the piston of air cylinder 39.

Forwardly of the hold down roll mechanism 30 is disposed a drive roll 9 journaled in the bearings 8 mounted on the members 1. The shafts of drive rolls 9, 19 and 32, at one end thereof, are provided with sprockets 46 over which are trained a drive chain 47 causing concurrent rotation of the drive rolls. Said chain 47 being also trained over spaced chain sprockets 48 and 49 mounted on shafts 50 and 51, respectively, journaled in the members 1. Shaft 50 having a second sprocket 52 which is driven from a motor 53 by means of drive chain 54.

In advance of the hold down mechanism 30, and as best shown in FIG. 9, is a platen 55 extending between the opposite members 1. To one side of the platen 55 is a drive pulley 56 and forwardly of the platen is a second drive pulley 57. An endless flexible rubber belt 58 is trained over pulleys 56 and 57 and platen 55, to pass beneath the members 1 to a take up device 59, guide pulley 60 and upwards to pulley 56. The guide pulley 60 is rigid with a shaft 61 journaled in suitable bearings mounted on the base support 5. One end of shaft 61 has a suitable sprocket 62 mounted on one end thereof and is driven by a chain 63 trained thereover and over a similar sprocket 64 on the motor and speed reducer combination 65. The take up device 59 is of well known form and is mounted on support 5. Beneath belt 58 and extending transversely thereof is a rotary brush 66 mounted in a shaft 67 journaled in bearings 68 mounted on suitable supports 69 which are preferably adjustably suspended from the members 1 by suitable means 70. Brush 66 may be rotated by a suitable belt drive from a motor 71 suspended from an adjacent member 1.

Figure 12:
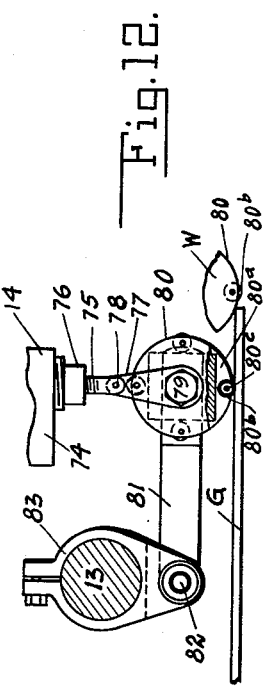
FIG. 12 shows an enlarged section taken on lines XII—XII of FIG. 3 showing details of the glass cutter.

Above platen 55 and belt 58 is a glass cut scoring mechanism 72 similar to the cut scoring mechanism 10. Such mechanism includes brackets 73 mounted on opposite members 1 and which support a vertically adjustable cutter bar 12. Rearwardly of and below the cutter bar, as best shown in FIG. 9, is a cutter guide bar 13 supported by brackets 73. Glass cutters 14 are adjustably mounted longitudinally of the cutter bar 12 and guide bar 13. As best seen in FIG. 12, the glass cutter assembly comprises a body portion 74 within which is mounted a spring loaded reciprocating piston having a portion 75 extending below body 74. Said piston portion 75 having a threaded portion upon which is mounted an adjusting nut 76 limiting downward movement of the piston for positioning wheel holder 80 relative to the advancing edge of the glass sheet G. Pivotally mounted on piston portion 75 and depending therefrom is a member 77 connected to 75 by the pin 78. The lower end of member 77 is suitably apertured to receive a shaft 79 having a cutter wheel holder 80 mounted thereon and retained in place by the guide arm 81 pivotally mounted at 82 upon the bearing 83 mounted on the bar 13. The cutter wheel holder 80 is of sufficient thickness to provide four equally spaced recesses 80a in the periphery thereof to receive the circular glass cutters 80b retained in the recesses by the shafts 80c. The cutter wheel holder 80 is spring loaded so as to be rotatable on its shaft under sufficient torque applied by the fingers to position the cutter 80b for engagement with the sheet G passing therebeneath but remains fixed relative to its shaft 79a when engaged by the glass. As shown in FIG. 12, a glass sheet moving into position beneath the cutter mechanism first engages the cutter holder wheel at W and upon advancing, lifts the cutter holder wheel 80 and piston against spring tension on the piston. The glass then moves beneath the cutter 80b without chipping and is suitably scored to the desired depth. When a cutter 80b loses its cutting edge the wheel holder 80 may be forceably rotated to present another cutter 80b. Mounted above belt 58 at opposite sides of cutter mechanism 72 are glass hold down rolls 84 mounted on shafts 85 journaled in the bearings 86. Said bearings being vertically adjustably mounted on the members 1 by the pins 87. The pins 87 extending through bearing 86 and having compression springs 88 thereon extending between the bearings 86 and the adjusting nuts 89. The nuts 89 are adjusted to normally hold rollers 84 against belt 58 and the rollers are raised against the compression of said springs as the glass moves beneath the rollers.

The glass sheet upon belt 58 upon moving past the cut scoring mechanism 72 is suitably scored and passes beneath the cut running roll assemblies 90. There being provided a suitable number of assemblies 90, 90a, 90b, etc. as required. The spacing of roll assembly 90 from cut scoring mechanism 72 is such as to permit the rear edge of the glass sheet to move from beneath the cutters 14 before the forward edge of the sheet passes between the rolls of roll assembly 90. The spacing between roll assembly 90 and 90a, or 90b, etc. may be more or less than the longitudinal length of the glass sheet.

Figures 5, 6:
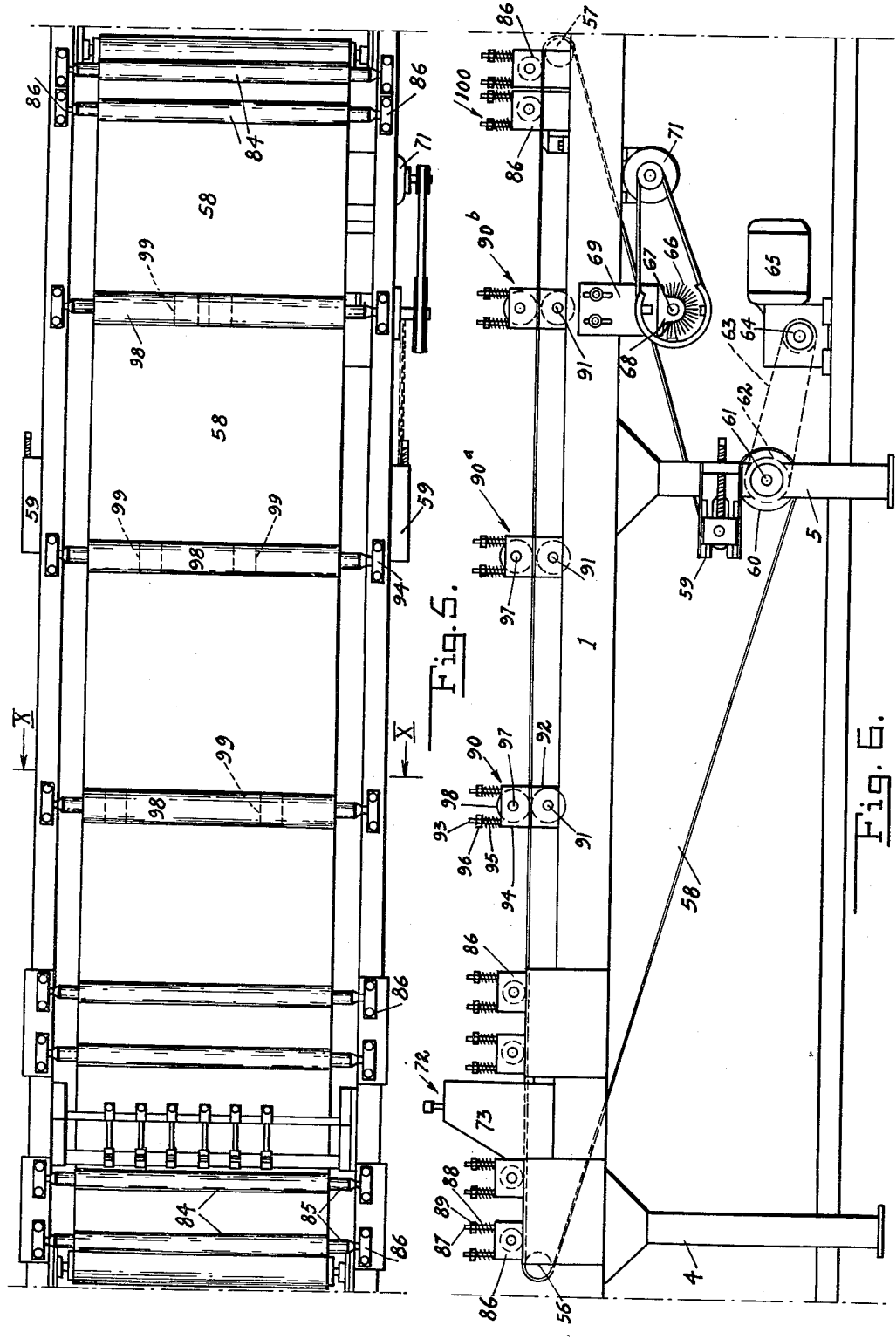
FIG. 5 shows an enlarged plan view of the mid-portion of the apparatus, embodying the breaker rolls.
FIG. 6 shows a side elevation of the apparatus of FIG. 5.

Each roll assembly 90, 90a, 90b, etc. as best shown in FIG. 10 comprises a bottom roll 91 disposed beneath belt 58 and journaled at each end in bearings 92 mounted on the members 1 by means of bolts 93. A plurality of bolt openings 93a being preferably provided in the members 1 for adjustably spacing the said roll assemblies. Each bolt 93 extends upwardly through bearings 92 and have moveably mounted thereon the bearings 94. Coil springs 95 are disposed upon bolts 93 above bearings 94 to resiliently urge bearings 94 towards bearings 92, and nuts 96 adjustably determine the tension in said springs. Journaled in bearings 94 and disposed above belt 58 is a top roll 97. Roll 97 has a compressible rubber covering 98 extending transversely of belt 58 and roll 91 has spaced covering portions 99. The spacing of portions 99 being such to underlie the scored cuts in the glass sheet to be run as the sheet moves between rolls 91 and 97. Portions 99 are also resilient and preferably harder or not so readily compressible as the covering 98. As the belt 58 and glass sheet thereon passes between 91 and 97, the coverings on each roll are slightly compressed and the free edges of the belt and the glass thereon are deflected sufficiently to run the cuts in the glass above covering portions 99. As shown in FIG. 5, the glass sheet has a plurality of cuts scored therein, and successive rolls 91, as shown by dotted lines, have coverings 99 spaced longitudinally thereof to underlie the cuts to be run. Should the longitudinal scores in the glass sheet be all run after passing between the roll assemblies 90, 90a, 90b, etc. and no transverse scores are to be run, the severed glass sheet sections may be removed from belt 58 in any desirable manner. When, however, transverse scores are also cut in the sheet, hold down roll assemblies 100 are preferably mounted adjacent the end of section B. These latter assemblies preferably comprise spaced pairs of bearings 86, as shown, with rolls such as 84 journaled therein and disposed above below belt 58. Such assemblies hold the glass sheet sections for a purpose to be described.

Where transverse cuts are to be run in the glass sections moving off section B, such cuts can be run and fall upon section C for collection in a desired manner. Section C when made integral with section B may have side members 1 between which extend shafts 101 adjacent each end of section C. Shafts 101 are journaled at their end portion in members 1 in any suitable manner and have mounted thereon a suitable resilient covering over which is trained a suitable endless belt 102. The upper surface of the belt 102 moving between shafts 101, as shown in FIG. 11, is preferably in a horizontal plane below that of the upper surface of belt 58. Belt 102 is also trained over a suitable pulley of a suitable belt tightening device 59 disposed below the members 1 and also over pulley 60 which is suitably driven by a motor 65 through the chain drive 63. Such belt tightening device and motor drive may be the same as upon section B.

Adjustably mounted on the members 1 are bearing plates 103 extending outwardly therefrom for support of bearings 104 in which are journaled the ends of shaft 105. Shaft 105 has mounted thereon a resilient cylindrical covering 106 the lower peripheral portion of which is slightly below the plane of the upper face of the glass sections moving off belt 58 onto belt 102. The axis of rotation of shaft 105 is spaced longitudinally of the apparatus a sufficient distance from the axis of rotation of the adjacent belt pulley 57 so that downward deflection of the advancing end of the glass sheet section run the transverse cut in the section as it moves past pulley 57 and off belt 58, as best shown in FIG. 11. The severed glass section then falls upon belt 102 and is passed along for collection.

The apparatus as hereinbefore described may be assembled as a continuous unit embodying sections A, B and C. Under such conditions the entire apparatus may be driven continuously for advancing glass sheets successively therethrough for scoring suitable cuts and running said cuts. When this is done suitable controls must be provided for successively operating the platen assembly 21 and the hold down roll mechanism 30.

When motor 53 is actuated rolls 9 are continuously rotated to advance a glass sheet through section A. In order to provide sufficient time for platen assembly 21 to rotate the glass sheet thereon the motor must be stopped so as to position the sheet upon the platen. After the glass sheet is positioned upon the platen assembly, the air motors 22 and 39 must be suitably actuated. This may be accomplished by a suitable arrangement of limit switches and air valves in any well known manner. Such control means are well known in the art and form no part of the present invention. It will suffice therefore to say that a suitable limit switch indicated generally at 107 is adjustably mounted in the path of the glass sheet moving over section A of the apparatus so as to be engaged by the forward end of the glass sheet whenever the glass sheet is approximately centered over platen of piston 23 of air cylinder 22. This limit switch is in electrical circuit with motor 53 and air motors 22 and 39, to successively stop motor 53 and forward movement of the glass sheet, actuate suitable valves to operate air motor 39 to raise hold down roll shaft 33, then actuate air motor 22 to raise the platen and glass sheet thereon above rolls 9, rotate the sheet 90° and return it to the rolls 9. Thereafter air motor 39 lowers hold down roller 33 to re-engage the glass and motor 53 is again actuated to advance the glass sheet onto section B for further cut scoring as desired. Each successive sheet placed upon rollers 9 at the left and advancing into contact with limit switch 107 causing the same described sequence of operations.

When, however, section A is not necessary, as when only longitudinal cuts are being run in the sheet, section A may be eliminated and the drive mechanisms of belts 58 and 102 may be continuously operated. In such cases the glass may be fed directly upon belt 58. Where the entire apparatus is maintained is assembled relation for alternate use and non-use of section A, the limit switch 107 may be disconnected from motor 53 and the latter continuously driven to advance the sheet over rolls 9 onto belt 58 for initial scoring under cutter assembly 72 as hereinbefore described.

Having thus described my invention, it will be obvious to those skilled in the art that many changes in details of construction may be made without departing from the invention. It is to be understood, therefore, that such detail as is shown is for purposes of illustration and not limitation, except as made necessary by the scope of the appended claims.

I claim:
1. Apparatus for running pairs of scored cuts in glass sheets moving in a direction longitudinally of the scored cuts, comprising a moving flat flexible glass sheet supporting belt, a rotatable roller disposed transversely beneath said belt and having a rubber covering of substantial thickness thereon engaging the under side of the belt in the horizontal plane thereof and beneath each scored cut of the glass supported sheet to be run, said roller rubber covering being of a width substantially greater than the scored cut, a second rotatable roller disposed transversely of and above said belt with the axes of rotation of both rollers in vertical alignment, said second roller being vertically adjustable relative to said belt, and a rubber covering of substantial thickness on said second roller in pressure engagement with the top surface of the glass sheet moving thereunder, said second roller covering being of a width substantially that of said belt and having a degree of deflection greater than the covering on the first-named roller.

2. Apparatus as in claim 1 wherein the glass sheet has a plurality of transversely spaced scored cuts extending longitudinally of the sheet and the first-named roller has spaced rubber coverings thereon disposed beneath two of said transversely cut spaced scored cuts to be run.

3. Apparatus for simultaneously running two spaced scored cuts in a glass sheet moving in a direction longitudinally of the said cuts, comprising a moving flat flexible glass sheet supporting belt, a rotatable roller disposed transversely beneath said belt and having a rubber covering thereon engaging the under side of the belt in the horizontal plane thereof and beneath the scored cuts to be run, said covering fully supporting said belt only beneath said scored cuts to be run, a second rotatable roller disposed transversely above said belt with the axis of rotation thereof vertically aligned with the axis of rotation of the first-named roller, and a resilient rubber covering of substantial thickness on said second-named roller extending transversely beyond each said scored cuts, said second-named roller being vertically adjustable for exerting belt deflecting pressure on said glass sheet outwardly of said bottom roller supported scored cuts.

4. In a glass cutting tool, in combination,
a housing,
a spring-loaded piston movably mounted within the housing and having a portion depending from the housing,
a yoke pivotally mounted upon said depending piston portion,
a selectively rotatable cutting wheel holder mounted upon said yoke and depending therefrom,
glass cutting wheels pivotally mounted in spaced relation about the periphery of the holder and extending outwardly therefrom,
a guide surface on said holder adjacent each cutting wheel for engagement by the leading edge of a glass sheet moving towards the cutting wheel and causing displacement of the holder relative to the sheet,
a guide lever pivotally connected with said holder and yoke translating said holder displacement into vertical displacement relative to said sheet and lifting the cutting wheel into a position for scoring a cut in the glass sheet beginning with the leading edge of the sheet moving beneath the cutting wheel.

5. Apparatus for successively scoring transverse and longitudinal cuts in a series of spaced moving glass sheets and thereafter running the transverse cuts in each sheet, comprising,
a base,
means on the base for receiving and successively advancing spaced glass sheets beneath cutters scoring transversely spaced cuts longitudinally of each moving sheet between the opposite side margins thereof, a second means for receiving and raising each said scored sheet above said first-named means and rotating the sheet in a horizontal plane to dispose the cuts scored thereon at an angle to the direction of travel in subsequently moving through the apparatus, resilient belt means for receiving the rotated sheet from said second-named means and advancing the sheet beneath a plurality of spaced cutters to score additional cuts in the sheet parallel to the direction of movement thereof, pairs of opposing transversely disposed rolls spaced longitudinally of said belt and receiving the moving belt and scored glass sheet thereon between such rolls, the upper roll of each said pair of rolls having a resilient covering thereon of substantial thickness extending transversely across the width of the belt and glass sheet thereon, the lower roll of each said pair of rolls having a resilient covering thereon of substantial thickness disposed beneath a pair of score cuts to be run, said lower roll covering being of less resiliency than the covering of the upper roll, and adjustable resilient means rotatably mounting opposite ends of the upper roll of each said pair of rolls providing an initial compressive force upon the belt to drive the rolls independently of the glass thereon and imposing a downward cut running deflection of the belt and glass sheet thereon outwardly of the respective bottom roll coverings over which the belt supported glass moves.

6. Apparatus as defined in claim 5, wherein the severed sheets are received upon a second moving belt on said base extending in alignment with but below the horizontal plane of the first belt, a roll member disposed transversely of the front end of the second belt inwardly thereof and in spaced relation to the belt for downwardly deflecting the advancing edge of each sheet towards the second belt as each transverse score moves off the first belt, and means above said first belt adjacent the second said belt for retaining the rear portion of the advancing glass sheet section against its supporting belt.

7. Apparatus as defined in claim 5, wherein a plurality of cut running opposing pairs of resilient rolls are provided, the bottom roll of each said pair having pressure applying surfaces thereon spaced in staggered relation to such surfaces on the other bottom rolls, whereby successive cuts are run in the sheet as it passes between successive pairs of rolls.

References Cited in the file of this patent

UNITED STATES PATENTS

| | | |
|---|---|---|
| 477,585 | Wilson | June 21, 1892 |
| 557,200 | Goodell | Mar. 31, 1896 |
| 1,134,292 | Smith | Apr. 6, 1915 |
| 1,642,839 | Chadwick | Sept. 20, 1927 |
| 1,762,575 | Fowler | June 10, 1930 |
| 2,042,819 | Allison | June 2, 1936 |
| 2,236,011 | Shock | Mar. 25, 1941 |
| 2,504,655 | Dallas | Apr. 18, 1950 |
| 2,515,076 | Brichard | July 11, 1950 |
| 2,556,757 | Guild | June 12, 1951 |
| 2,693,053 | Eakin | Nov. 2, 1954 |
| 2,756,545 | Atkeson | July 31, 1956 |